United States Patent [19]

Citron

[11] Patent Number: 4,867,047
[45] Date of Patent: Sep. 19, 1989

[54] VENTILATOR DOOR AND FAN CONTROL ASSEMBLY FOR RANGE HOOD OF A RECREATIONAL VEHICLE

[75] Inventor: Manning Citron, San Marino, Calif.
[73] Assignee: Jensen General Corp., Los Angeles, Calif.
[21] Appl. No.: 242,640
[22] Filed: Sep. 12, 1988
[51] Int. Cl.[4] .............................................. F23J 11/00
[52] U.S. Cl. ..................................... 98/116; 126/286; 126/299 D
[58] Field of Search ....................... 98/59, 116, 121.2; 126/286, 295, 299 R, 299 D

[56] References Cited

U.S. PATENT DOCUMENTS

| | | | |
|---|---|---|---|
| 1,971,920 | 8/1934 | Ross | 98/116 X |
| 2,084,807 | 6/1937 | Hueglin | 98/116 X |
| 2,355,836 | 8/1944 | Willey | 98/116 |
| 2,483,547 | 10/1949 | Koch | 98/116 X |
| 3,589,266 | 6/1971 | Hike | 126/299 D |
| 4,006,672 | 2/1977 | Matsuyoshi et al. | 98/116 X |

FOREIGN PATENT DOCUMENTS

| | | | |
|---|---|---|---|
| 125544 | 10/1947 | Australia | 98/116 |
| 574975 | 4/1933 | Fed. Rep. of Germany | 98/116 |
| 689255 | 3/1953 | United Kingdom | 98/116 |

*Primary Examiner*—Harold Joyce
*Attorney, Agent, or Firm*—Harlan P. Huebner

[57] ABSTRACT

A ventilator door and fan control assembly for use with a range hood which is adapted for use in a recreational vehicle wherein there is a plate associated with said ventilation door to open and close the door that is activated by a cable controlled by an operator handle mounted on the range hood within a switch holder and guide. The operator handle and the switch holder and guide are adapted to receive a conventional fan switch and simultaneously activate or deactivate a fan with the opening or closing of the ventilator door.

10 Claims, 4 Drawing Sheets

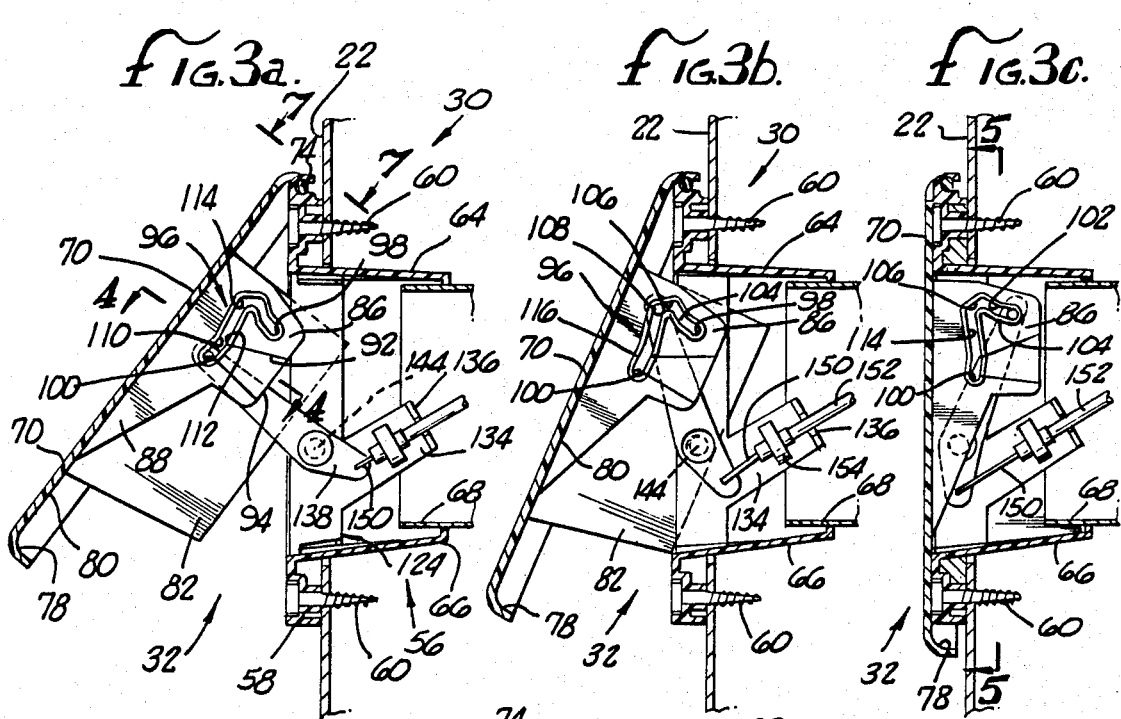
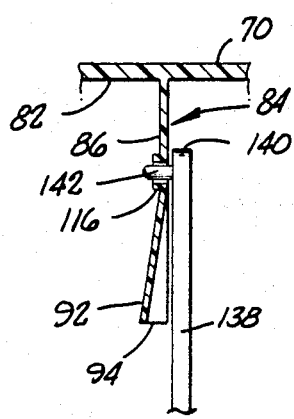
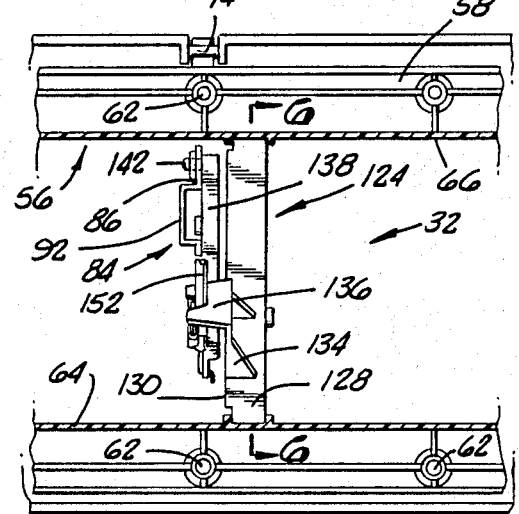
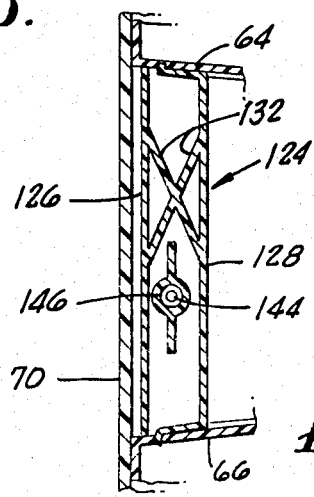

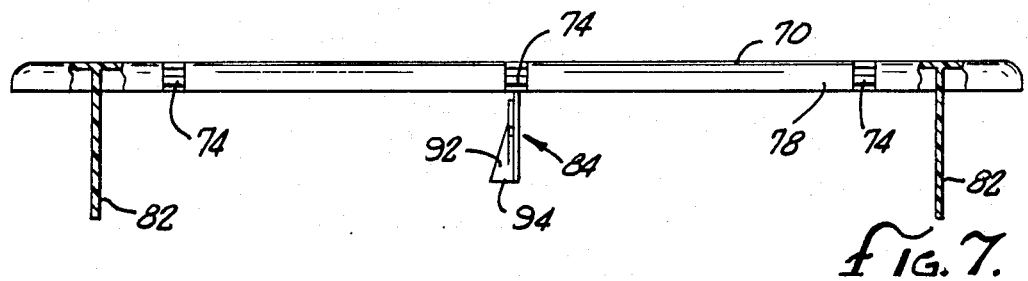
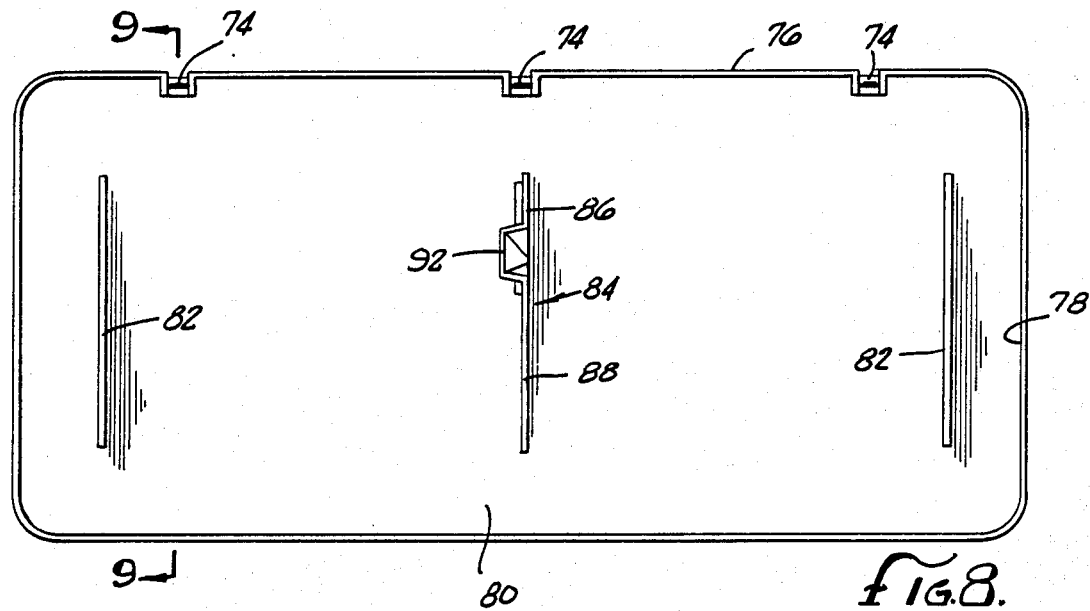
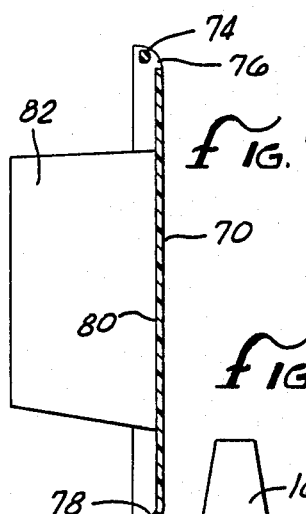
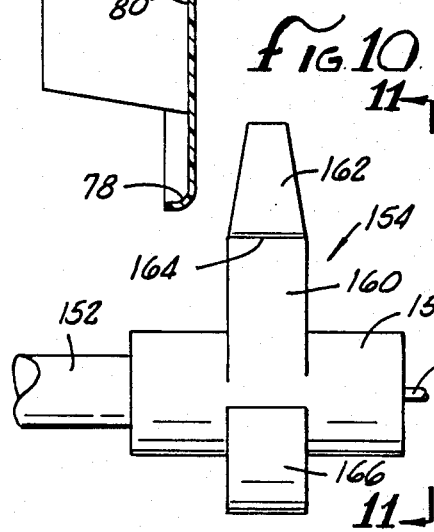
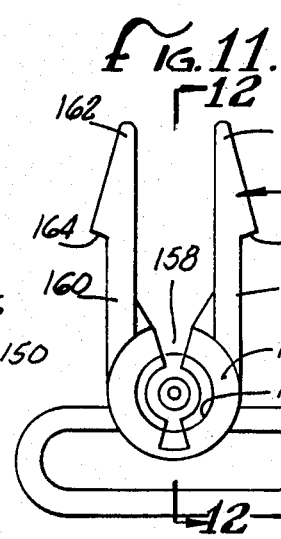
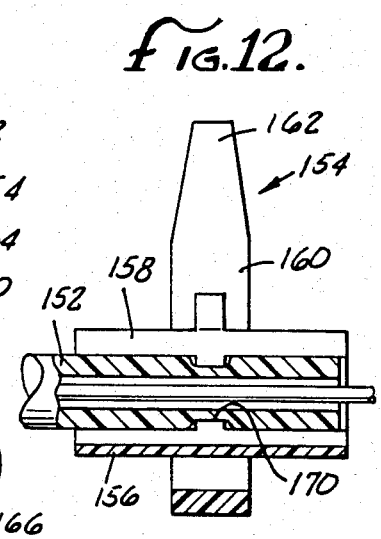

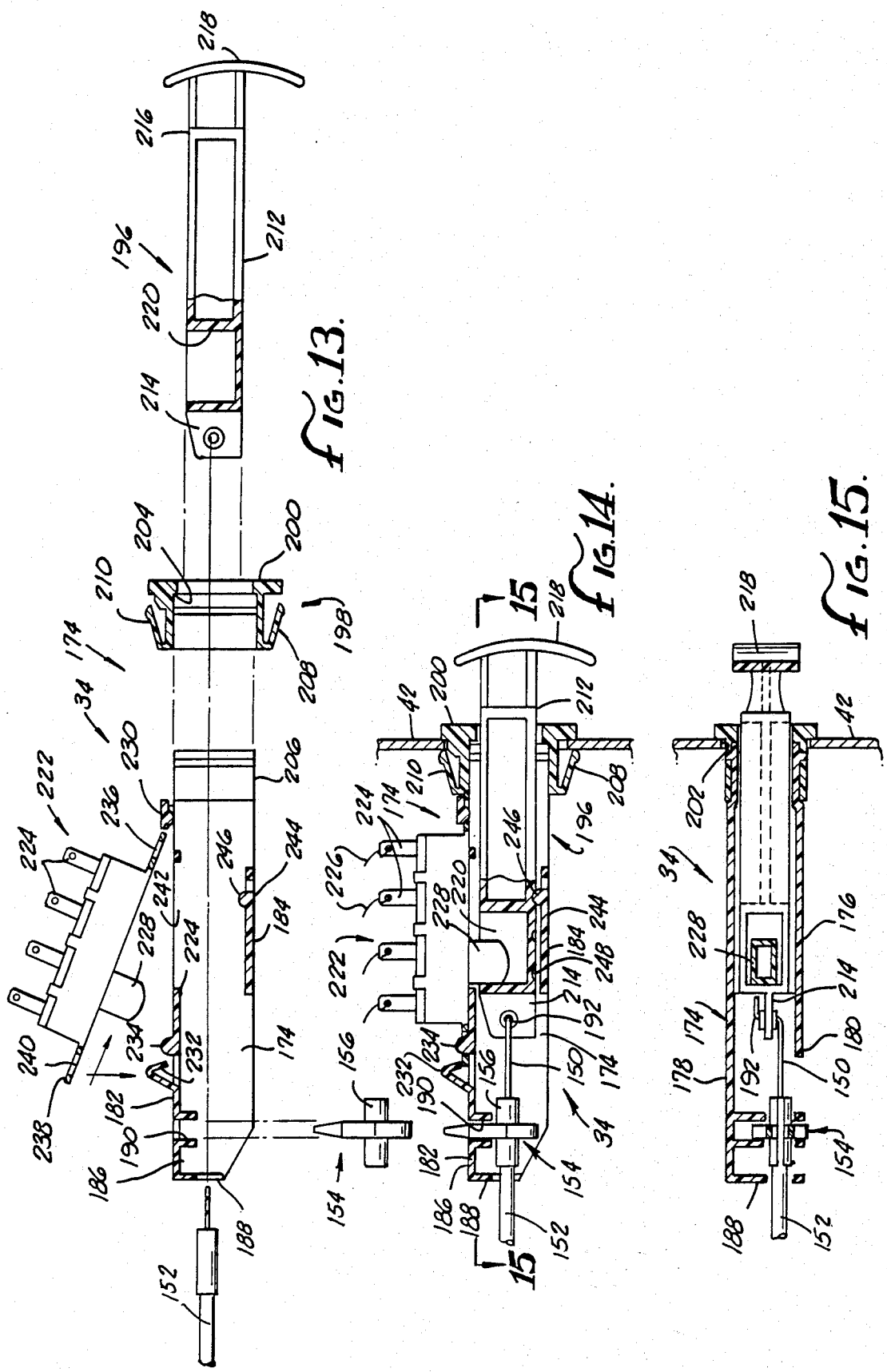

VENTILATOR DOOR AND FAN CONTROL ASSEMBLY FOR RANGE HOOD OF A RECREATIONAL VEHICLE

BACKGROUND OF THE INVENTION

1. Field of the Invention

This invention relates to a combination ventilator door and fan actuator assembly for a recreational vehicle (RV) range hood.

2. Description of the Prior Art

RV's are usually equipped with ranges and hoods mounted thereabove. The hoods usually are equipped with fans to suck up kitchen and cooking smells and expel the same through a ventilation opening to the outside.

Previous ventilation means have been openings in the roof of the RV's or through openings in the side of the RV. In some instances the ventilation openings are covered with hinged covers they must be manually opened by pushing the same from the inside and locking it in the desired position. In addition, some covers must be pulled open from the outside to set them at the desired opening.

Once the ventilation door is opened then the range hood fan must be separately activated. Also, after the fan is deactivated and turned off it is necessary to expend additional time in moving to the ventilator door to close the same.

The two actions of opening the ventilator and then turning on the fan takes time. In addition, if the weather is inclement and the ventilator door must be closed from the outside it necessitates a person going outside in the bad whether to accomplish a closing.

SUMMARY OF THE INVENTION

It is a object of the present inventor to provide a combination ventilator door and fan actuator means to activate or deactivate an RV range hood fan as the ventilator door opens and closes respectively.

Another object of the present invention is to provide a combination ventilator door and fan actuator means which has part mounted on an RV side wall and part mounted on a range hood, and can accept distance variations between the ventilator door and actuator on the range hood.

A still further object of the present invention is to provide a combination ventilator door and fan actuator that includes a hinged door and cable means from the front of the range hood to open and close the door.

Another object of the present invention is to provide a combination ventilator door and fan actuator means wherein adjacent the front of an RV range hood there is an operator handle means engagable with a fan switch to control the operation of the fan.

A yet further object of the present invention is to provide a combination ventilator door and fan actuator means wherein there are camming means associated with the ventilator door to insure several positions for the ventilator door.

These and other objects and advantages will become apparent from the following part of the specification wherein details have been described for the competence of disclosure, without intending to limit the scope of the invention which is set forth in the appended claims.

BRIEF DESCRIPTION OF THE DRAWINGS

These advantages may be more clearly understood from the following detailed description and by reference to the drawings in which:

FIGS. 3a, 3b and 3c are side elevational cross sectional views of the ventilator door in different positions from fully open, an intermediate open position and a fully closed position;

FIG. 3d is a diagramatical representation of an over center latch of the door to prevent its inadvertent opening from the outside;

FIG. 4 is a sectional view of a cam and cam follower taken on line 4—4 of FIG. 3a;

FIG. 5 is an elevational view of the door opening means taken on line 5—5 of FIG. 3c;

FIG. 6 is a cross-sectional view of a cam follower support and cable holding arm taken on line 6—6 of FIG. 5;

FIG. 7 is a top elevational view of the ventilator door taken on line 7—7 of FIG. 3a;

FIG. 8 is an elevational view of the back of the ventilator door;

FIG. 9 is elevational cross sectional view of the ventilator door taken on line 9—9 of FIG. 8;

FIG. 10 is an elevational end view of clip means to retain the activating cable;

FIG. 11 is an elevational side view of the clip means of FIG. 10 and taken on line 11—11 of FIG. 10;

FIG. 12 is a partial sectional view of the clip of FIG. 10 taken on line 12—12 of FIG. 12;

FIG. 13 is an exploded side elevational cross-sectional view of the actuator handle and fan switch control mechanism of the present invention;

FIG. 14 is similar to FIG. 13 with the parts assembled; and

FIG. 15 is a top cross sectional view taken on line 15—15 of FIG. 14.

DETAILED DESCRIPTION OF THE PREFERRED EMBODIMENT

Figure 1:
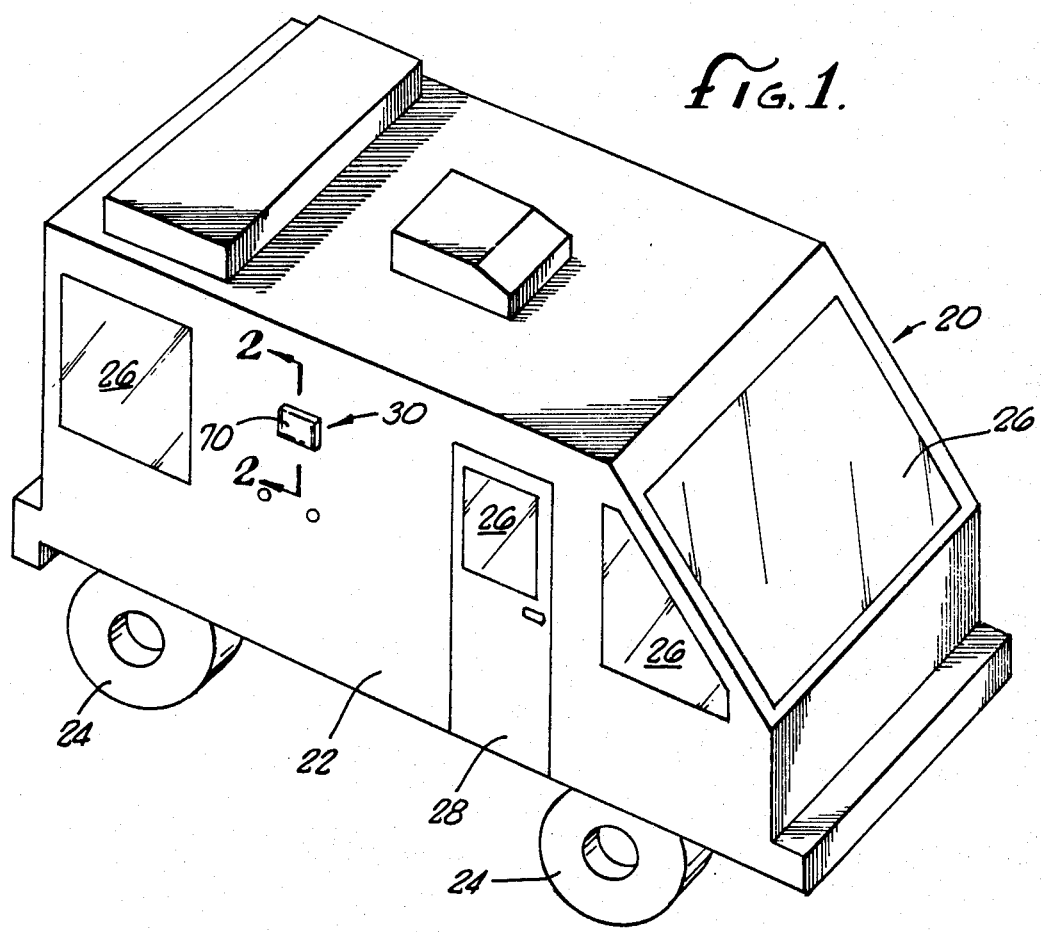
FIG. 1 is an environmental view of an RV with the present invention in place.

There is illustrated in FIG. 1 a conventional recreational vehicle or "RV" generally designated 20. The RV includes an exterior side wall 22, wheels 24 various windows 26 and in the case of the illustration a door 28 in the wall 22.

Mounted on the exterior side wall 22 in the illustration a ventilator door and fan control assembly generally designated 30 which are preferably of molded plastic.

The assembly 30 includes generally two major portions a ventilator door control positioning means designated 32, FIGS. 3a through 6 and a fan control means designated 34, FIGS. 13-15.

The ventilator door control positioning means 32 is fitted into an appropriate opening 36 preferably a quadrilateral which extends from the exterior side 22 through a structure including an interior wall 38. Between the exterior and interior wall surface of side walls 22 and 38 respectively insulation not illustrated may be positioned.

Mounted on the interior wall surface 38 is a conventional RV range hood designated 40 having a front face or control panel 42. Mounted within the hood is a filter 44 and above the filter 44 is a conventional electrical suction fan 46. The fan 46 is to draw odors and heat from a range, not shown, generally installed immediately below the hood and pass them out an opening 48 in the back 50 of the hood 40 through the aligned opening 36 in the wall.

Turning now in more details to the ventilator door control positioning means 32 attention is directed to FIGS. 3a through 12.

There is a frame member designated 56 which includes an annular exterior flange 58 larger than the opening 36 which overlies the exterior side wall 22 and is secured to the wall 22 by means of appropriate screws 60 that pass through screw holes 62, see FIG. 5, in the annular flange 58.

Figure 2:
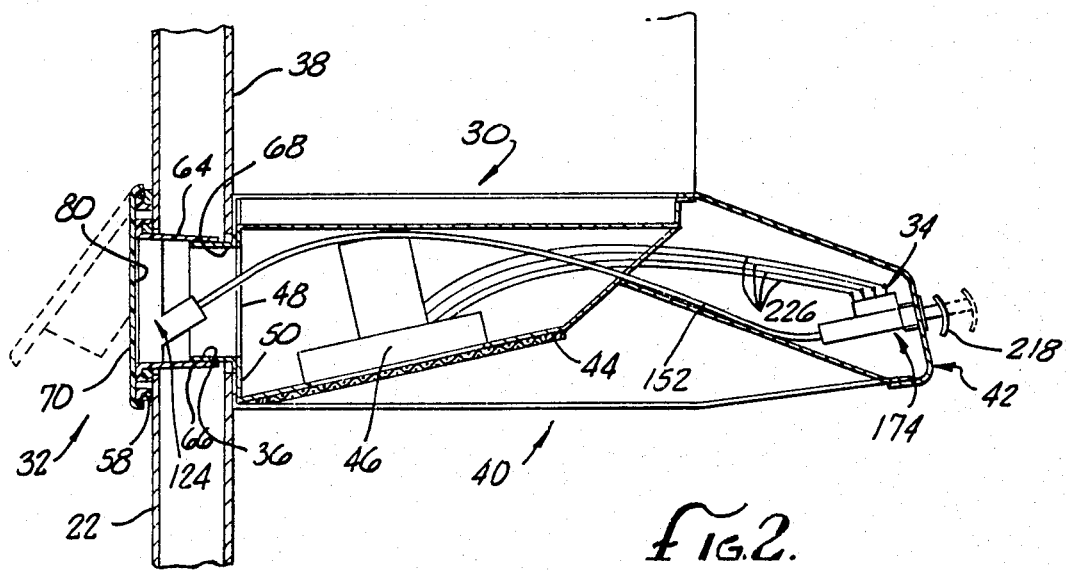
FIG. 2 is a side elevational cross-sectional view taken on line 2—2 of FIG. 1.

Extending inwardly from the exterior annular flange 58 is a box extension having top and bottom walls 64 and 66 respectively and end walls not shown. The walls 64 and 66 are generally of a length to pass from the exterior side wall through most of the opening 36, see FIG. 2. As best seen in FIGS. 3a, b and c, the bottom wall 66 is preferably tapered upwardly as it moves into the RV in order to prevent rain or snow from passing into the RV. In other words the wall 66 will act as an exterior drain should rain or snow enter the box extension. The top wall 64 may also be tapered and interfitted within the box extension 68 extending from the back 50 of the hood 40.

Mounted on the frame 58 is a ventilator door 70 which is peripherally larger than the frame 58 to completely cover the flange 58. The door 70 is hingedly mounted to the flange 58 by means of hinges 74 at the top 76 of the door 70.

The construction of the door 70 preferably includes a marginal edge 78 which is curved inwardly and adapted to interfit around the annular flange 58 to prevent rain and snow from entering the RV when the door 70 is closed, see FIG. 3c. The marginal edge 78 extends from an interior surface 80 of the door 70.

The door 70 is also formed with a pair of wind and splash shields 82, see FIGS. 7-9, which will help prevent water from entering the opening when the door is open. More importantly, the shields 82 will also prevent wind from entering the RV through the opening 36 from the sides when the door 70 is open.

Centrally located on the inside of the door 70 and projecting from surface 80 is a cam plate designated 84. The plate 84 includes an upper cam groove section 86 and preferably there is a tapered strengthening rib 88 projecting downwardly from the section 86. In addition, the upper cam groove section 86 includes an off set cam follower guide 92 which projects to the left of a vertical plane of plate 84. The guide 92 tapers toward the door 70 from edge 94 terminating at a cam surface configuration designated 96 for reasons to be subsequently explained.

The cam surface configuration 94 in the plate 84 includes a cut out preferably through the plate 84 which when viewed from the left, see FIGS. 3a, 3b, and 3c, appears to be a reverse number "7".

The cam surface configuration 94 is continuous from a full closure end or point 98 to a fully open end or point 100. The surface 94 includes three positions, a fully closed door cam surface 102 that runs from point 98 to point 104, an upper intermediate open door cam surface 106 that runs from point 104 to point 108 and a lower fully open door cam surface 110 that runs from a point 112 down to fully open end 100. The cam surfaces 106 and 110 are interconnected by cam surface leg 114.

As can be seen from the drawings the closure cam surface, intermediate open cam surface and fully open cam surfaces are each elongated. The reason for the respective elongation is to accommodate product tolerances so that when a cam follower to be described rides in the cam slide surface configuration 96 it will not be required to be moved to an exact point on the cam surfaces in order to achieve the desired position.

The cam surface configuration may be merely formed in the cam section 86 by being molded with no marginal lip or as is illustrated a marginal lip 116 may be molded around the cam opening and form a relatively wide cam slide surface.

Mounted in the door frame member 56 is a cam follower support designated 124. The support 124 includes a front wall 126, a rear wall 128 and a side wall 130 extending therebetween. As best seen in FIG. 6 there are preferably cross support gussets 132 between the front and rear walls 126 and 128 respectively.

Projecting rearwardly from the rear wall 128 is a cable mounting arm 134 with a slotted rear wall 136 projecting normal to the plane of the arm 134.

Pivotally mounted on the side wall 130 of the support 124 is a lever or cam arm 138. The arm 138 adjacent its upper end 140 includes a cam follower pin 142 adapted to be seated in the cam surface configuration 96 as seen in FIG. 4. The arm 138 is secured to support 124 by a pivot pin 144 projecting therefrom and passing through an opening 146 in wall 130. The pivot pin 144 is preferably made of plastic as is the arm 138 and preferably split to allow a locking of the pin 144 within the bore or opening 146.

In order to install the cam follower pin 142 the frame 56 is secured in the opening of the RV wherein the cover 70 has first been installed in the frame. With the cover 70 hingedly mounted on the frame at 74 the support 124 and cam arm 138 may be placed. The cam follower is then positioned within the off set cam follower guide 92 and as the cover 70 is closed toward the frame 56 the cam follower 142 will ride in the guide and seat itself in the cam surface slide configuration 96 ready for use. Such construction eliminates the need for exact positioning or endeavoring to manually move the follower into position, the guide 92 is an automatic self positioning means of the cam follower 142 on the surface 96.

At the end opposite where the cam follower 142 is mounted a sliding cable 150 with formed ends is secured to the arm 138 by means of those ends. The cable 150 is conventional and includes a sheath or cable covering 152. In order to mount the sheath or cable covering 152 it is guided by the slotted rear wall 136 and to fixedly secure the same to the support 124 a cable clip designed 154, see FIGS. 10-12, is provided. The clip 154 is preferably formed of resilient plastic and includes a tubular body portion 156 having an interior dimension when tightened will clamp tightly around the sheathing 152. The body 156 is formed with a slit 158 along its length so that the gripping can be achieved.

The body portion 156 includes a pair of legs 160 that project in spaced parallel relationship on either side of the slit 158. The ends 162 may each be tapered and include a cut away portion forming a locking rib 164. There is on the opposite side of the body 156 a finger grip loop 166.

In order to lock the cable covering 152 it is inserted through the slit 158 into the body 156. This is accomplished by spreading the legs 160. By means of the finger loop 166 the ends 162 of legs 160 are pushed through an opening (unnumbered) in the cable mounting arm 134 which pinch the legs 160 and lock them partially around the covering 152. In order to prevent further lateral movement of the sheathing or covering 152 the annular interior 168, see FIGS. 11 and 12, may be fitted with a detent 170 to bit into the sheathing.

From the arm 134 the cable 150 and sheathing 152 continue to the fan control means 34 which includes a switch holder and guide means generally designed 174, see FIGS. 13-15. The cable 150 and sheathing 152 are flexible and longer than the direct distance from fan means 34 to guide means 152. The reason for extra length is so that it can accommodate to change of distance as the cable opens or closes the cover 70.

The holder means 174 is preferably molded from plastic and includes a pair of elongated side walls 176 and 178. The side wall 176 preferably is formed with a cut away 180 for access to the interior for assembly. Bridging the side walls 176 and 178 at the top is a top wall 182. The is a small bottom wall 184 that bridges the side walls 176 and 178.

At the rear end 186 of top wall 182 there is a slotted cable receiving rear wall 188 through which the cable and sheathing 152 pass and the sheathing is pinched therein. To hold the covering 152 at the upper end another cable clip 154 passes around the cover and in turn the clip 154 is squeezed through clip opening 190 where it spreads apart and locks in place.

The end of cable 150 is secured to a handle operator means designated 196, see FIG. 13, which is slidably mounted within the holder means 174.

In order to mount the holder means 174 in the panel or front face 42 of the range hood 40 a bezel or squeeze clip designated 198 is provided. The bezel 198 includes a frame 200 having a portion that passes through an opening 202, see FIGS. 14 and 15, in the panel 42. The frame 200 also includes a passage 204 to receive the end 206 of holder means 174.

To maintain the bezel 198 a pair of spring tabs 208 and 210 are formed on the frame and by depressing them toward each other they and a portion of the frame 200 pass through opening 202 and will return to their original position bearing against the panel 42 locking the bezel 198 and holder means 174 in place.

The operator handle means 196 includes an elongated body portion 212 with a cable tab 214 projecting from the body portion which receives the end 192 of the cable. At the opposite end 216 of the body portion 212 is a handle 218 which is preferably curved to accommodate fingers for pushing or pulling the handle 218 and in turn sliding the body portion 212.

The body portion 212 has a cross section slightly less than an elongated opening in the switch handle means 174 so that the same may slide therein.

At the forward part of the body position 212 there is a switch receiving opening or recess 220 that projects toward the top wall 182.

Mounted on the top wall 182 is a conventional electrical control switch generally designated 222. The switch includes a plurality of terminals 224 having wires 226 that pass to fan 46 to control the speed of the fan as well as turning it on-off. Projecting from the switch 222 is an on-off switch knob 228.

In order to mount the switch 222 there is a retainer tab 230 with an undercut formed on the top wall 182, a flexible locking clip 232 and an indexing detent 234 on the wall 182. One end 236, see FIG. 13, is positioned under the tab 230, and the opposite end 238 of the switch 222 will be pressed against and snap under the flexible locking clip 232 with an index opening 240 aligned with the index detent 234. The switch 222 is pushed angularly inward and down, see arrows in FIG. 13. In order for the on-off switch knob 228 to pass into the holder 174 and into the switch receiving opening 220 an opening 242 is provided in the top wall 182.

As can be seen from FIGS. 14 and 15 as the operator handle 196 is pulled outwardly the wall of the opening 220 will bear against the on-off switch knob 228 and move it to a position where the fan 46 will be turned on and the ventilator door 70 will be simultaneously opened. In order to assure fixed positions for the on-off switch knob 228, as the operator handle 196 shifts back and forth, there may be provided a spring finger 244 with a locking detent 246 in the bottom wall 184 to engage one of several locking depressions 248 which may be formed on the operator 196.

Most of the parts described above may be molded plastic of a sufficient hardness to withstand movement and biasing. In the instances where portions of the parts are to act as springs the plastic is of a resilient nature.

With the structure defined it can be seen that when the handle 218 is pushed inward the cable 150 will react against the cam arm 138 moving it to the position in FIG. 3c where the cover 70 is closed. In other words, in looking at FIG. 3d, the cam pin 142 being in its retracted position causes the pivot 144 of arm 138 to be over center from the cover hinges 74 to assure a tight locking closure until the cam pin 142 is moved.

In order to open the ventilator door 70 the handle 218 is pulled outwardly transmitting a sliding motion to cable 150 within fixed covering or sheathing 152. This cable movement in turn pivots the arm 138 and the cam follower pin 142 will move in the cam surface slide configuration 96 pushing the cam plate 84 and door 70 outwardly either to an intermediate position of FIG. 3b or a fully open position of FIG. 3a. As the body portion 212 moves, the switch knob 228 also is pushed and moves from an off position to an intermediate on or "low" position or a full or "high" position to expel odors through the assembly 30.

In other words the opening or closing of the RV ventilator door is keyed to simultaneous activation or deactivation of the suction fan 46 within the RV range hood 40.

Further, because of vehicle vibration as the RV moves over the road it may be advisabe to provide releasable locking means to maintain the cover in the closed position when traveling. In such a case the cam arm 138 may be equipped with a side projecting detent that interfits within a groove on the cam plate 84 to assure the locking.

In addition, any other type of releasable locking means may be employed to releasably lock the cover 70 in any of its stages of opening.

The invention and its attendant advantages will be understood from the foregoing description and it will be apparent that various changes may be made in the form, construction and arrangements of the parts without departing from the spirit and scope thereof or sacrificing its material advantages, the arrangements herein before described being merely by way of example. I do not wish to be restricted to the specific forms shown or uses mentioned, except as defined in the accompanying claims, wherein various portions have been separated for clarity of reading and not for emphasis.

I claim:

1. A ventilator door and fan control assembly for use with a recreational vehicle range hood where the range hood includes an electrical fan and is mounted on the inside surface of an exterior wall of said recreational vehicle and an opening through said exterior wall is provided and said opening communicates with said range hood, said assembly comprising;

a frame member adapted to be fitted in said opening;

a ventilator door having a top, sides and a bottom and of an area at least as great as the area of said opening, said door overlying said frame and hingedly mounted thereto;

ventilator door control positioning means associated with said frame and said ventilator door, said means adapted to move said hinged ventilator door between closed and open positions;

switch holder and guide means remote from said frame member adapted to receive and maintain an electrical switch thereon adapted to activate and deactivate said electrical fan;

operator handle means slideably mounted in said switch holder and guide means adapted to be linked with said electrical switch to open and close said switch during sliding movement of said operator handle means;

cable means having a first and second end linking said ventilator door control positioning means and said operator handle means so that movement of said operator handle means will simultaneously move said ventilator door and activate-deactivate said electrical fan;

said ventilator door control positioning means includes on said door a cam plate having a cam slide surface; and a cam follower pivotally independently mounted in said frame cammingly engaging said cam slide surface whereby pivotal movement of said cam follower will cause said follower to move along said cam slide surface moving said ventilator door between said closed and open positions.

2. A ventilator door and fan control assembly as defined in claim 1 wherein;

said ventilator door is fitted with wind shields adjacent each of said sides to deter wind and water from entering said frame when said door is open.

3. A ventilator door and fan control assembly as defined in claim 1 wherein:

a cam follower support is mounted in said frame, and a pivotable cam arm is mounted thereon with said pivot below said cam follower; and said cam follower projects from said cam arm.

4. A ventilator door and fan control assembly as defined in claim 3 wherein:

said cam slide surface includes at least three interconnected cam angles whereby said door may be in a closed position, intermediate open position and fully open position dependent upon the position of said cam follower relative to the pivot of said pivotable cam arm.

5. A ventilator door and fan control assembly as defined in claim 3 wherein:

said cam follower support includes a cable mounting arm;

said cable means is flexible and includes a sheathing adapted to be fixedly secured to said mounting arm, and a cable slidably positioned within said sheathing;

a spring cable clip adapted to surround said sheathing and interfit within said cam follower support to fix said sheathing against movement; and a first end of said cable coupled to said pivotable cam arm whereby movement of said cable within said sheathing will pivot said cam arm.

6. A ventilator door and fan control assembly as defined in claim 1 wherein:

said switch holder and guide means is an elongated four sided frame having a front and rear end and a passage therethrough and includes electrical switch locking means on said switch holder and guide means adapted to releasably hold said electrical switch which switch includes an on-off switch knob that projects into said passage when assembled with said switch holder and guide means.

7. A ventilator door and fan control assembly as defined in claim 8 wherein:

said operator handle means includes an elongated body portion slideably interfitted within said passage, said body portion including a recess receiving said on-off switch knob, whereby sliding movement of said body portion will shift said on-off switch knob to control activation of said fan;

a handle portion formed on said body portion projecting therefrom to control sliding movement of said body portion; and a cable securement means on said body portion with said second end of said cable secured thereto, whereby movement of said handle portion will simultaneously pivot said door and activate-deactivate said fan.

8. A ventilator door and fan control assembly as defined in claim 7 wherein:

a spring cable clip surrounds said sheathing adjacent said second end of said cable which clip is interfitted within said switch holder and guide means at said front end whereby said sheathing is additionally fixed against lateral movement when said cable is shifted.

9. An assembly to open and close a ventilator door on a recreational vehicle and simultaneously activate-deactivate a fan having an on off switch and said fan is mounted in a range hood where said ventilator door is on the outside of said recreational vehicle and is pivotally secured for opening and closing to a frame mounted in a complementary opening in an exterior wall of said recreational vehicle said assembly comprising:

a ventilator door control positioning means coupled to said ventilator door;

fan control means remote from said ventilator door control positioning means including a shiftable member associated with said on-off switch;

cable means interconnecting said ventilator door control positioning means and said shiftable member whereby movement of said shiftable member will cause simultaneously ventilator door and fan operation; and wherein said ventilator door control positioning means includes a cam plate mounted on said ventilator door, said plate having a cam slide surface; and a cam follower pivotally mounted to said frame cammingly engaging said cam slide surface and linked to said shiftable member of said fan control means by said cable means.

10. An assembly as defined in claim 9 wherein: said fan control means includes a switch holder and guide means mounted on said range hood; and said shiftable member is an operator handle means with said cable means linked thereto.

* * * * *